July 28, 1964

J. GRILLO 3,142,793

CONTROL SYSTEM FOR STANDBY MOTOR ARMATURE CURRENT
IN AN UNINTERRUPTED POWER SUPPLY

Filed Sept. 12, 1961

JOSEPH GRILLO
INVENTOR.

BY Sal A. Biarratava
George B. Onjevolk
ATTORNEYS

United States Patent Office 3,142,793
Patented July 28, 1964

3,142,793
CONTROL SYSTEM FOR STANDBY MOTOR ARMATURE CURRENT IN AN UNINTERRUPTED POWER SUPPLY
Joseph Grillo, New Milford, N.J., assignor to General Precision Inc., Little Falls, N.J., a corporation of Delaware
Filed Sept. 12, 1961, Ser. No. 137,628
7 Claims. (Cl. 322—9)

This invention relates to a control system and more particularly to a system for controlling standby motor current in an uninterrupted power system.

An uninterrupted power system is one in which power is applied to the load without interruption when the prime source of power is lost. When the prime source of power is lost, power is supplied to the load by an auxiliary source, which in the case of the present invention is a battery.

Figure 1:
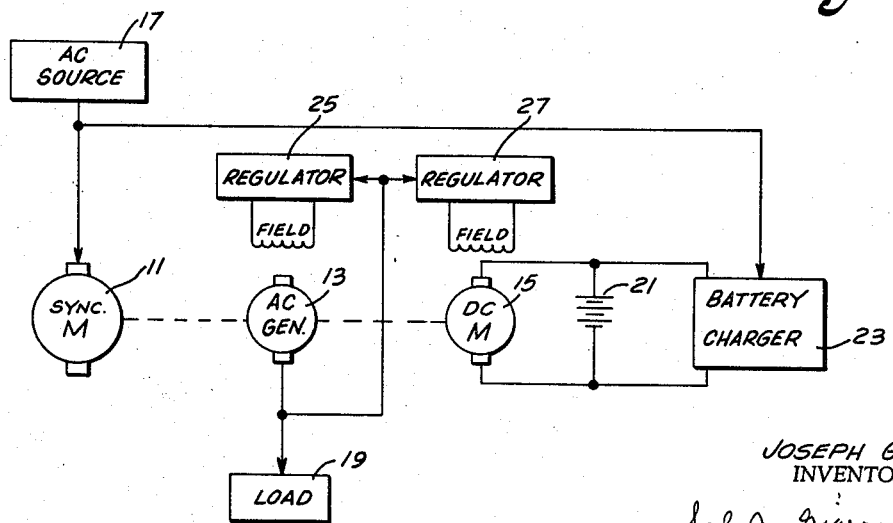

FIG. 1 illustrates a block diagram of one form of an uninterrupted power system. It comprises a synchronous motor 11, an A.C. generator 13, and a D.C. motor 15, which are all mechanically coupled together. The synchronous motor 11 is energized by an A.C. source 17 and the A.C. generator 13, which is driven by the synchronous motor 11, supplies power to a load 19. When the A.C. power from the source 17 to the synchronous motor 11 is interrupted, the D.C. motor 15 takes over and drives the A.C. generator 13 so as to provide A.C. power to the load 19. The D.C. motor 15 is driven by a battery 21. Under normal conditions when power is available from the source 17 to the system, the power from the source 17 will energize a battery charger 23 which charges the battery 21. A voltage regulator 25 is provided responsive to the output of the A.C. generator 13 to control the excitation of the field winding of the A.C. generator in order to maintain the output voltage from the A.C. generator constant. The frequency of the output from the A.C. generator is maintained constant and equal to the frequency of the source 17 or some multiple of it by means of the synchronous motor 11. When the A.C. source is interrupted and power is delivered from the standby battery 21 via the motor 15, the motor 15 is speed regulated by means of a regulator 27. The regulator 27 operates in response to the output of the A.C. generator 13 to control the excitation of the field winding of the motor 15 to maintain the speed of the motor constant and the output frequency of the generator 13 constant. When power is available from the source 17 and the synchronous motor 11 is driving the A.C. generator 13, the motor 15 could be either running as a motor drawing current from the battery 21, or running as a generator delivering current to the battery 21, or running without any current transfer between the motor 15 and the battery 21. Whether the motor 15 runs as a motor, runs as a generator, or runs without any transfer of current depends upon the adjustment of the field excitation of the motor by means of the regulator 27. When the synchronous motor 11 is being driven by the source 17 the system runs at the speed dictated by the source 17. Adjustment of the field excitation by means of the regulator 27 does not affect the speed of the motor 15, but will affect the armature current flow in the D.C. motor. If the field excitation by the speed regulator 27 is adjusted so that the counter voltage generated by the motor is exactly equal to the voltage of the battery 21, then no D.C. current will flow between the battery and the armature of the motor. If the excitation of the field of the motor 15 supplied by the regulator 27 is such that the counter voltage generated by the motor 15 is lower than the battery voltage, then the motor 15 will draw current from the battery 21 and run as a motor driving the A.C. generator 13. If the excitation of the field of the motor 15 by the regulator 27 is such that the counter voltage generated by the motor 15 is higher than the voltage of the battery 21, then the motor 15 will operate as a generator and deliver current to the battery 21.

Normally, it is preferable to have the motor 15 draw current from the battery and operate as a motor driving the A.C. generator 13. Under these conditions most of the power will be supplied to the load 19 from the source 17 through the synchronous motor 11. A small percentage of the power, about ten to fifteen percent, will be supplied tot he load 19 from the battery 21 through the D.C. motor 15. It is preferable to operate the system in this manner with the motor 15 drawing current from the battery 21 and driving the A.C. generator 13 because brush and commutator deterioration and wear result when the motor commutator carries little or no current and a poor frequency transient results when the motor 15 is shifted from operating as a generator to operating as a motor when power is interrupted from the source 17.

The present invention provides a system for controlling the magnitude and direction of the armature current flow in the motor 15 when A.C. power is available from the source 17 to the system so as to maintain the operating condition of the motor 15 to be such that it draws current from the battery 21 and drives the A.C. generator 13 wth only a small percentage of the power being transferred from the battery 21 through the motor 15 to the load 19.

Accordingly, a principal object of the present invention is to provide a control system of the type described.

A further object of this invention is to provide a control system for controlling the armature current of a D.C. motor in an uninterrupted power supply system of the type described.

A further object of this invention is to provide a control system to maintain the operating condition of a D.C. motor in an uninterrupted power system of the type described so that the D.C. motor draws armature current and supplies a small percentage of the power to the load.

Figure 2:
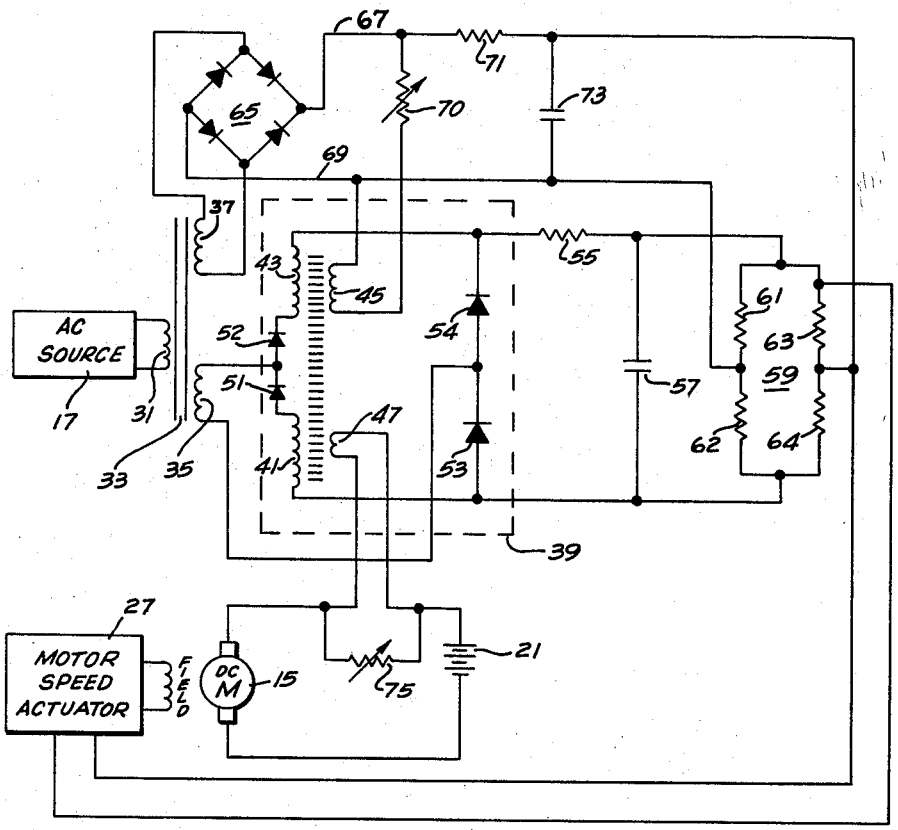

Further objects and advantages of the present invention will become readily apparent as the following detailed description of the invention unfolds and when taken in conjunction with the drawings wherein:

FIG. 1, described above, discloses a block diagram of a power system of the type in which the control system of the present invention is used; and FIG. 2 is a circuit diagram of the control system of the present invention.

As shown in FIG. 2 A.C. power from the source 17 is applied to the control system across the primary winding 31 of a transformer 33. The transformer 33 has two secondary windings 35 and 37. The secondary winding 35 is connected to a magnetic amplifier 39 having load windings 41 and 43, control windings 45 and 47, and rectifiers 51 through 54. Rectifiers 51 and 52 are connected in series with the same polarity from one end terminal of the load winding 41 to one end terminal of the load winding 43. The rectifiers 53 and 54 are connected in series with the same polarity from the other end terminal of the load winding 41 to the other end terminal of the load winding 43. The secondary winding 35 is connected from the junction between the rectifiers 51 and 52 to the junction between the rectifiers 53 and 54. The polarity of the rectifiers 51 and 52 is such to permit current flow respectively from the secondary winding 35 through the rectifier 52 and through the load winding 41 and the rectifier 51 to the secondary winding 35. Similarly, the polarity of the rectifier 54 is such to permit current flow from the secondary winding 35 through rectifier 54 to the junction between the load winding 43 and the rectifier 54 and the polarity of the rectifier 53 is such to permit current flow from the junction between the load winding 41 and the rectifier 53 through the rectifier 53 to the secondary winding 35. With this circuit a D.C. voltage will be produced between the junction of the load winding 43 and the rectifier 54 and the junction of the load winding 41 and the rectifier 53, and the magnitude of the D.C. voltage will be determined by the amount of current flowing through the control windings 45 and 47 of the magnetic amplifier 39. This D.C. voltage is filtered by means of a resistor 55 and a capacitor 57 by connecting the junction between the load winding 43 and the rectifier 54 to one side of the capacitor 57 through the resistor 55 and connecting the junction between the load winding 41 and the rectifier 53 to the other side of the capacitor 57. As a result, a filtered D.C. voltage will be produced across the capacitor 57 and the magnitude of the D.C. voltage will depend upon the amount of current flowing through the control windings 45 and 47. This filtered D.C. voltage generated across the capacitor 57 is applied across a resistor bridge 59 comprising resistors 61 through 64. Each of the resistors 61 through 64 comprises one arm of the bridge with the resistor 61 being connected to the resistor 63 at the point on the bridge 59 at which one side of the capacitor 57 is connected to the bridge and the resistor 62 being connected to the resistor 64 at the point on the bridge where the other side of the capacitor 57 is connected to the bridge. To complete the bridge the resistor 61 is connected to the resistor 62 and the resistor 63 is connected to the resistor 64. The positive side of the D.C. voltage produced across capacitor 57 is applied to the junction between resistors 61 and 63 and the negative side to the junction between resistors 62 and 64.

The secondary winding 37 is connected across the input terminals of a full wave rectifier bridge 65, the output terminals of which are connected to leads 67 and 69, respectively. Thus, a D.C. voltage is developed across leads 67 and 69 with the positive side on lead 67 and the negative side on lead 69. A series circuit comprising the control winding 45 and a variable resistor 70 is connected between the leads 67 and 69 so that D.C. current flows through the control winding 45 and the amount of this current is determined by the variable resistor 70. The lead 67 is connected through a resistor 71 to one side of a capacitor 73 and the lead 69 is connected to the other side of the capacitor 73. The resistor 71 and the capacitor 73 serve as a filter to produce a filtered D.C. voltage across the capacitor 73. This filtered D.C. voltage is connected across the bridge 59 by connecting the positive voltage side of the capacitor 73 to the junction between resistors 63 and 64 and the negative voltage side of the capacitor 73 to the junction between resistors 61 and 62. Thus, the D.C. voltage across the capacitor 57 and the D.C. voltage across capacitor 73 will cause current flow through the resistors 61 through 64 of the bridge 59. These two D.C. voltages will cause current flow in the same direction through the resistors 61 and 64 and in the opposite direction through resistors 62 and 63. Thus, the voltage across the resistor 63 will be a signal of a magnitude and polarity representing the difference between the two D.C. voltages generated across the capacitors 73 and 57, respectively. This signal voltage is applied to an input of the regulator 27 to control the amount of excitation current applied to the field of the D.C. motor 15. The battery 21 is connected to the armature of the motor 15 through the magnetic amplifier control winding 47 which is shunted by a variable resistor 75. Thus, the output voltage of the magnetic amplifier 39 produced across capacitor 57 is controlled by the amount of the armature current flowing through the motor 15. Since only a small amount of the armature current is needed to control the operation of the magnetic amplifier, the variable resistor 75 shunting the control winding 47 is provided and most of the armature current flows through this variable resistor 75. A fixed percentage of the armature current will flow through the control winding 47 and as a result a D.C. output voltage will be produced across the capacitor 57 varying linearly with the armature current of the motor 15. The control system is set so that when the armature current flowing through the motor 15 has the desired magnitude and polarity, the output voltage generated across the capacitor 57 will equal the constant reference voltage generated across the capacitor 73 by means of the full wave rectifier bridge 65. As a result, no signal voltage will be produced across the resistor 63 of the bridge 59 when the armature current of the motor 15 has the desired magnitude and polarity and no input signal will be applied to the regulator 27 from the bridge 59. When the armature current flowing through the motor 15 increases above the desired value, this action will change the voltage across the capacitor 57 resulting in an output signal voltage being produced across the resistor 63. If the armature current through the motor 15 decreases below the desired value, the voltage across the capacitor 57 will change in the opposite direction and as a result, a voltage of the opposite polarity will be produced across the resistor 63. In response to the signal voltage produced across the resistor 63, the regulator 27 will change the excitation applied to the field winding of the motor 15 until the voltage across the resistor 63 is again zero. Thus, when the voltage across the resistor 63 is of such polarity indicating that the armature current of the motor 15 is greater than the desired value, the regulator 27 in response to this signal voltage across the resistor 63 will change the excitation of the field winding of the motor 15 in a direction to make the motor 15 run slower. However, the motor 15 will be operating at a constant speed since it is maintained at this speed by the synchronous motor 11. The armature current of the motor 15, however, will decrease. The regulator 27 will continue to change the field excitation of the motor 15 until the armature current of the motor 15 decreases to such a value that the voltage across the resistor 63 decreases to zero. If the signal voltage across the resistor 63 is of such a polarity indicating that the armature current of the motor 15 is too low, then the regulator 27 in response to this signal voltage will change the excitation of the field winding of the motor 15 in a direction to cause the motor 15 to speed up. However, the motor 15 will not speed up because of its coupling with the synchronous motor 11 and its armature current will increase. The regulator 27 will change the excitation of the field winding of the motor 15 until the armature current of the motor 15 increases to a value such that the voltage produced across the capacitor 57 in response to this armature current equals the voltage produced across the capacitor 73. At this point the armature current of the motor 15 will be again at the desired value.

When power from the A.C. source 17 is interrupted, whereupon the D.C. motor 15 takes over and drives the A.C. generator to provide all the power to the load 19, the energization of the primary winding 31 of the transformer 33 will be cut off and as a result the control circuit will cease to operate and supply signals to the regulator 27.

The amount of armature current of the motor 15 can be controlled by varying the resistor 70. A change in the resistor 70 will change the current flowing in the control winding 45 which in turn will change the output voltage produced across the capacitor 57 by the magnetic amplifier 39. This, in turn, will cause a signal voltage to be produced across the resistor 63 and in response to this signal voltage, the regulator 27 will change the excitation of the field winding of the motor 15, which in response thereto will change its armature current until the voltage produced by the magnetic amplifier 39 across the capacitor 57 again equals the voltage produced across the capacitor 73 by the rectifier 65.

Thus, a system is provided which will precisely control the armature current of the motor 15 and which will automatically cease to operate when the power from the A.C. source is interrupted.

Many modifications may be made to the above-described specific embodiment of the invention without departing from the spirit and scope thereof.

What is claimed is:

1. In a power supply system comprising an A.C. source, a synchronous motor driven by said A.C. source, a D.C. motor, a generator, said synchronous motor, said generator, and said D.C. motor being mechanically coupled together to run at a speed determined by said synchronous motor, and a D.C. source connected to provide armature current for said D.C. motor, the improvement comprising means responsive to the armature current in said D.C. motor to control the excitation of the field of said D.C. motor to maintain said armature current constant.

2. In a power supply system comprising an A.C. source, a synchronous motor driven by said A.C. source, a generator, a D.C. motor, said synchronous motor, said generator and said D.C. motor being mechanically coupled together to run at a speed determined by said synchronous motor, and a D.C. source connected to provide armature current for said D.C. motor, the improvement comprising means to generate a first signal varying in accordance with said armature current, means to produce a reference signal, means to subtract said first signal voltage from said reference signal to produce a difference signal, and means responsive to said difference signal to change the excitation of the field of said D.C. motor so as to change the armature current of said D.C. motor in a direction to reduce said difference signal until said difference signal becomes zero.

3. In a power supply system comprising an A.C. source, a synchronous motor driven by said A.C. source, a generator, a D.C. motor, said synchronous motor, said generator, and said D.C. motor being mechanically coupled together to run at a speed determined by said synchronous motor, and a D.C. source connected to provide armature current for said D.C. motor, the improvement comprising means to produce a first signal varying linearly with the armature current of said D.C. motor, means to produce a reference signal, means responsive to said first signal and to said reference signal to produce a difference signal having a polarity indicative of the difference between said first signal and said reference signal, and means responsive to said difference signal to change the excitation of the field winding of said D.C. motor so as to charge the armature current of said D.C. motor in a direction to decrease said difference signal until said difference signal becomes zero.

4. In a power supply system comprising an A.C. source, a synchronous motor driven by said A.C. source, a generator, a D.C. motor, said synchronous motor, said generator and said D.C. motor being mechanically coupled together to run at a speed determined by said synchronous motor, and a D.C. source connected to provide armature current for said D.C. motor, the improvement comprising means responsive to the armature current of said D.C. motor to produce from said A.C. source a signal which varies in accordance with the armature current of said D.C. motor, and means responsive to said signal to control the excitation of said D.C. motor so as to maintain said armature current constant.

5. In a power supply system comprising an A.C. source, a synchronous motor driven by said A.C. source, a generator, a D.C. motor, said synchronous motor, said generator and said D.C. motor being mechanically coupled together to run at a speed determined by said synchronous motor, and a D.C. source connected to provide armature current for said D.C. motor, the improvement comprising means responsive to the armature current of said D.C. motor to provide from said A.C. source a first signal varying in accordance with said armature current, means to provide a reference signal from said A.C. source, means to provide a difference signal having a magnitude and polarity indicative of the difference between said first signal and said reference signal, and means responsive to said difference signal to change the excitation of the field of said D.C. motor so as to change the armature current of said D.C. motor in a direction to decrease said difference signal until said difference signal becomes zero.

6. In a power supply system comprising an A.C. source, a synchronous motor driven by said A.C. source, a generator, a D.C. motor, said synchronous motor, said generator, and said D.C. motor being mechanically coupled to run at a speed determined by said synchronous motor, and a D.C. source connected to provide armature current for said D.C. motor, the improvement comprising a magnetic amplifier having a load winding and a control winding, means to apply power from said A.C. source to said load winding to produce a signal voltage varying in accordance with the current flowing in said control winding, means to cause current to flow in said control winding having a magnitude varying in accordance with the armature current of said D.C. motor, means to produce a reference voltage from said A.C. source, and means to produce from said reference voltage and said signal voltage a difference voltage indicative of the difference between said reference voltage and said signal voltage, and means responsive to said difference voltage to change the excitation of said D.C. motor so as to change the excitation of said D.C. motor so as to change the armature current of said D.C. motor in a direction to reduce said difference voltage until said difference voltage becomes zero.

7. The combination as recited in claim 6 wherein said magnetic amplifier includes a second control winding connected to have current flow therethrough and means to selectively vary the current flowing through said control winding.

References Cited in the file of this patent
UNITED STATES PATENTS

| | | |
|---|---|---|
| 1,851,692 | Zucker | Mar. 29, 1932 |
| 2,518,394 | Spencer | Aug. 8, 1950 |
| 2,725,509 | Wilson et al. | Nov. 29, 1955 |